(12) United States Patent
Mayster et al.

(10) Patent No.: US 11,107,099 B2
(45) Date of Patent: Aug. 31, 2021

(54) BRAND PENETRATION DETERMINATION SYSTEM USING IMAGE SEMANTIC CONTENT

(71) Applicant: Google LLC, Mountain View, CA (US)

(72) Inventors: Yan Mayster, Aurora, CO (US); Brian Edmond Brewington, Superior, CO (US); Rick Inoue, Mountain View, CA (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 16/510,374

(22) Filed: Jul. 12, 2019

(65) Prior Publication Data

US 2020/0202371 A1  Jun. 25, 2020

Related U.S. Application Data

(60) Provisional application No. 62/783,327, filed on Dec. 21, 2018.

(51) Int. Cl.
*G06Q 30/02* (2012.01)
*G06K 9/00* (2006.01)
(Continued)

(52) U.S. Cl.
CPC ....... *G06Q 30/0205* (2013.01); *G06K 9/0063* (2013.01); *G06N 20/00* (2019.01);
(Continued)

(58) Field of Classification Search
CPC ............ G06Q 10/00–50/00; G06T 1/00–19/00
(Continued)

(56) References Cited

U.S. PATENT DOCUMENTS 7,698,442 B1 * 4/2010 Krishnamurthy ... H04L 63/1483
709/229
9,338,603 B2 * 5/2016 Chao ...................... G06Q 30/00
(Continued)

OTHER PUBLICATIONS

Yang, Zhilin, Zili Bi, and Nan Zhou. "The double jeopardy phenomenon and the mediating effect of brand penetration between advertising and brand loyalty." Journal of Advertising Research 45.2 (2005): 211-221. (Year: 2005).*
(Continued)

*Primary Examiner* — Alan S Miller
(74) *Attorney, Agent, or Firm* — Dority & Manning, P.A.

(57) ABSTRACT

Example embodiments of the disclosed technology implement a brand penetration determination system using image semantic content. A geographic sub-region determination system is configured to partition a geographic area into two or more sub-regions. An image content analysis engine is configured to determine, from images captured at one or more sites within each sub-region, a number of detections of a brand within each respective sub-region. A brand penetration index generation system is configured to generate a brand penetration index for each sub-region based on the number of detections of the brand in the respective sub-region weighted by one or more factors (e.g., population factor, category factor, etc.), which is stored in memory with an indicator of each respective sub-region. In splitting the geographic area into two or more sub-regions, the number and/or boundaries of sub-regions are determined so as to ensure that the population within each sub-region is above a threshold.

20 Claims, 7 Drawing Sheets

(51) Int. Cl.
*G06T 7/00* (2017.01)
*G06N 20/00* (2019.01)
*G06T 7/70* (2017.01)

(52) U.S. Cl.
CPC ............... *G06T 7/70* (2017.01); *G06T 7/97* (2017.01); *G06T 2207/30242* (2013.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 10,163,116 | B2* | 12/2018 | Chhaya | G06Q 50/01 |
| 2005/0288859 | A1* | 12/2005 | Golding | G01C 21/3644 |
| | | | | 701/438 |
| 2009/0043623 | A1* | 2/2009 | Blades | G06Q 30/02 |
| | | | | 705/14.42 |
| 2009/0089310 | A1* | 4/2009 | Lara | G06F 16/972 |
| 2012/0197653 | A1* | 8/2012 | Short | G06Q 30/0201 |
| | | | | 705/1.1 |
| 2013/0045751 | A1* | 2/2013 | Chao | G01S 5/16 |
| | | | | 455/456.1 |
| 2013/0097011 | A1* | 4/2013 | Wang | G06Q 30/02 |
| | | | | 705/14.45 |
| 2013/0188886 | A1* | 7/2013 | Petrou | G06K 9/228 |
| | | | | 382/305 |
| 2015/0016712 | A1* | 1/2015 | Rhoads | G06T 17/00 |
| | | | | 382/154 |
| 2015/0092061 | A1* | 4/2015 | Chao | G06Q 10/06 |
| | | | | 348/158 |
| 2016/0034922 | A1* | 2/2016 | Chhaya | G06Q 30/0201 |
| | | | | 705/7.29 |
| 2016/0358190 | A1* | 12/2016 | Terrazas | G06F 16/29 |
| 2019/0034976 | A1* | 1/2019 | Hamedi | G06Q 30/0204 |

OTHER PUBLICATIONS

Dawes, John. "Interpretation of brand penetration figures that are reported by sub-groups." Journal of Targeting, Measurement and Analysis for Marketing 14.2 (2006): 173-183. (Year: 2006).*
Gebru, Timnit, et al. "Using deep learning and Google Street View to estimate the demographic makeup of neighborhoods across the United States." Proceedings of the National Academy of Sciences 114.50 (2017): 13108-13113. (Year: 2017).*
International Search Report and Written Opinion for PCT/US2019/012972 dated Apr. 25, 2019, 10 pages.
International Preliminary Report on Patenability for Application No. PCT/US2019/012972, dated Jul. 1, 2021, 7 pages.

* cited by examiner

BRAND PENETRATION DETERMINATION SYSTEM USING IMAGE SEMANTIC CONTENT

PRIORITY CLAIM

The present application is based upon and claims the right of priority to International Application No. PCT/US2019/012972, filed on Jan. 10, 2019, which is based upon and claims the right of priority to U.S. Provisional Application 62/783,327, filed on Dec. 21, 2018. Applicant claims priority to and the benefit of each of such applications and incorporates each of such applications by reference herein in its entirety for all purposes.

FIELD

The present disclosure relates generally to determining measures of brand penetration over geographic regions. More particularly, the present disclosure relates to brand penetration determination systems and methods that generate indices based on a number of brand detections from a plurality of geo-located images and corresponding locations within various partitioned sub-regions.

BACKGROUND

Image content analysis engines are currently being developed and deployed to detect a very wide array of objects and entities. Data obtained from these engines can be processed for later retrieval and analysis, which can span a wide range of applications and carry a heavy computational load. As such, additional technology is needed to provide useful data associated with analyzed images and related content while minimizing costs of storing such data, including, for example, the amount of computer memory required to store such data.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining a measure of brand penetration across a geographic area. The method includes splitting, by one or more computing devices, a geographic area into two or more sub-regions. The method also includes determining, by the one or more computing devices, from images captured at one or more sites within each sub-region, a number of detections of a brand within each respective sub-region. The method also includes generating, by the one or more computing devices, a brand penetration index for each sub-region, wherein the brand penetration index is based on the number of detections of the brand in the respective sub-region. The method also includes storing, by the one or more computing devices, the brand penetration index for each sub-region in memory in association with an indicator of the respective sub-region.

Another example aspect of the present disclosure is directed to a computing system. The computing system includes a geographic sub-region determination system configured to partition a geographic area into two or more sub-regions. The computing system also includes an image content analysis engine configured to determine, from images captured at one or more sites within each sub-region, a number of detections of a brand within each respective sub-region. The computing system also includes a brand penetration index generation system configured to generate a brand penetration index for each sub-region, wherein the brand penetration index is based on the number of detections of the brand in the respective sub-region weighted by one or more of a population factor based on a population within the sub-region or a category factor based on a category of goods associated with the brand. The geographic sub-region determination system is configured to determine, in splitting the geographic area into two or more sub-regions, the number of sub-regions and one or more boundaries of each sub-region so as to ensure that the population within each sub-region is above a threshold. The computing system also includes one or more tangible, computer-readable media configured to store the brand penetration index for each sub-region in association with an indicator of the respective sub-region.

Another example aspect of the present disclosure is directed to one or more tangible, non-transitory computer-readable media storing computer-readable instructions that when executed by one or more processors cause the one or more processors to perform operations. The operations include splitting a geographic area into two or more sub-regions. The operations also include determining from images captured at one or more sites within each sub-region, a number of detections of a brand within each respective sub-region. The operations also include generating a brand penetration index for each sub-region, wherein the brand penetration index is based on the number of detections of the brand in the respective sub-region. The operations also include storing the brand penetration index for each sub-region in memory in association with an indicator of the respective sub-region. The operations also include determining an electronic content item associated with the brand based at least in part on the brand penetration index for a given sub-region of the two or more sub-regions. The electronic content item is configured for delivery to and display on an electric device associated with the given sub-region.

Other aspects of the present disclosure are directed to various systems, apparatuses, non-transitory computer-readable media, computer program products, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
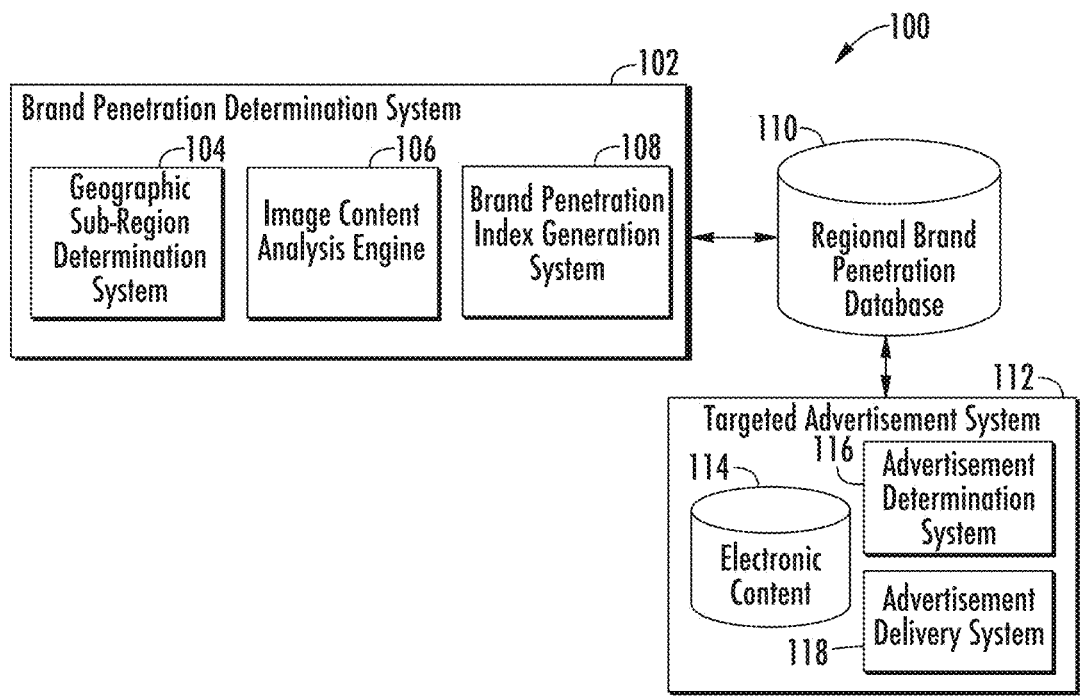
FIG. 1 depicts a block diagram of an example computing system for determining a measure of brand penetration across a geographic area, according to example embodiments of the present disclosure.

Reference numerals that are repeated across plural figures are intended to identify the same features in various implementations.

DETAILED DESCRIPTION

Systems and methods consistent with the present disclosure can include features for generating and storing a measure of brand penetration associated with a geographic region. More specifically, the disclosed systems and methods can employ an image content analysis model for determining brand detections from a plurality of geo-located images. Brand penetration indices and related measures can then be generated based on a number of brand detections and corresponding partitioned locations. For example, in some implementations, a brand penetration determination system can be configured to determine a distribution of two or more discretized sub-regions within a geographic region for which an associated measure of brand penetration can be determined. Sub-region numbers and/or boundaries can be determined so as to ensure that a population within each sub-region is above a threshold. By ensuring that the population of each sub-region is above that threshold, a computational burden imposed in storing statistically relevant brand indices for each sub-region is reduced. In addition, by ensuring that only brand indices for sub-regions having a statistically meaningful number of inhabitants are stored, the disclosed systems and method can provide useful data associated with an imagery corpus while simultaneously minimizing the costs of storing that data in memory.

It should be appreciated that implementation of embodiments of the disclosed technology can include controls allowing a user to make an election as to both if and when systems, programs, or features described herein may enable collection of user information (e.g., information about a user's current location, social network, social actions, or activities, profession, a user's preferences, or other user-specific features), images from one or more computing devices associated with a user and/or control data indicative of whether a user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In other examples, images and/or content determined from such images in accordance with the disclosed techniques can be treated to ensure that personally identifiable information such as images of people, street names and numbers of residences, and other personal information is removed.

According to aspects of the present disclosure, a computing system comprising one or more processors can be used to help implement aspects of the disclosed technology including a brand penetration determination system. In general, the brand penetration determination system can be configured to determine a measure of brand penetration across a geographic region. In some implementations, the brand penetration determination system can include a geographic sub-region determination system, an image content analysis engine, and/or a brand penetration index generation system.

In some implementations, a geographic sub-region determination system can be configured to split a geographic area into two or more sub-regions. Sub-regions can correspond, for example, to discretized cells within the geographic region that can have predetermined or dynamically determined sizes and/or boundaries based on one or more desired measures of brand penetration. For example, in some implementations, the brand penetration determination system can be configured to determine, in splitting the geographic area into two or more sub-regions, the boundaries of each sub-region according to one or more of a particular cell size and/or a particular geographic partitioning. For example, one method of partitioning a geographic area into sub-regions could correspond to implementation of a grid imposed over the geographic area. In some implementations, each cell in the grid can be characterized by a given shape (e.g., a square, rectangle, circle, pentagon, hexagon, or other polygon). In some implementations, each cell in the grid can be characterized by one or more dimensions (e.g., a width, length, height, and/or diameter dimension) having a predetermined or dynamically determined distance (e.g., a value measured in meters, kilometers, miles, or other suitable variable). In some implementations, a grid of cells corresponding to respective sub-regions can be uniform in size, while the cells can vary in size in other embodiments.

In some implementations, the geographic sub-region determination system can be configured to determine, in splitting the geographic area into two or more sub-regions, the number of sub-regions and the boundaries of each sub-region so as to ensure that the population within each sub-region is above a threshold. By ensuring that the population of each sub-region is above that threshold, a computational burden imposed in storing useful brand indices for each region is reduced.

When sub-region boundaries are uniform in size (e.g., as in the form of a uniform grid of cells) or when they are predetermined in size (e.g., corresponding to predetermined geographic partitions such as those corresponding to zip codes, neighborhood boundaries, town/district boundaries, state boundaries, country boundaries, etc.), the number of sub-regions can be reduced by excluding sub-regions whose population does not exceed the threshold.

In some implementations, population as described herein can correspond to a number of people within a given geographic area, such as determined from census data or other predefined databases associated with a geographic area. In this example, when ensuring that the population within each sub-region is above a threshold, the geographic sub-region determination system can determine the number and/or boundaries of each sub-region such that each sub-region has a population defined by a threshold corresponding to a number (x) of people in each sub-region.

Referring still to the geographic sub-region determination system, in other implementations, population as described herein can correspond to a determined number of goods associated with people in a given geographic area—for example, a number of homes, vehicles, businesses, electronic devices or particular categories or subsets of such goods. In this example, when ensuring that the population within each sub-region is above a threshold, the geographic sub-region determination system can determine the number and/or boundaries of each sub-region such that each sub-region has a population defined by a threshold corresponding to a number (y) of goods (e.g., homes, vehicles, businesses, electronic devices, etc.) in each sub-region.

Referring still to the geographic sub-region determination system, in other implementations, population as described herein can correspond to a determined number of images obtained for sites within a particular geographic area and/or a number of detections of goods, entities, or the like within such images. In this example, when ensuring that the population within each sub-region is above a threshold, the geographic sub-region determination system can determine the number and/or boundaries of each sub-region such that each sub-region has a population defined by a threshold corresponding to a number (z) of images and/or detected objects within the images in each sub-region.

By partitioning a geographic area into sub-regions such that the size of sub-regions is dynamically determined based on population density (or corresponding density of brand detections), the likelihood of including cells corresponding to sub-regions having little to no population of brand detections is reduced. This is accomplished at least in part by avoiding a scenario in which there are numerous sub-regions having associated brand indices, but where each sub-region has such a small number of inhabitants that the data from those sub-regions is not statistically relevant. Similarly, the size of cells within sub-regions having a greater number of brand detections can be determined so as to help ensure an appropriate size to maintain distinctions within a distribution level of brand detections. This can help ensure that meaningful brand penetration measures can be determined for a geographic area. As such, cell size can vary based on different regions. For example, cell size can be smaller in urban locations and can get progressively larger when transitioning from urban areas into suburban areas and into rural areas.

In some implementations, an image content analysis engine can be configured to determine, from images captured at one or more sites within each sub-region, a number of detections of a brand within each respective sub-region. In some embodiments, the images captured at one or more sites can include a substantially large collection of images. In some embodiments, the collection of images can have been captured at one or more sites within each sub-region by a camera operating at street level. For example, the camera operating at street level can be mounted on a vehicle and configured to obtain the collection of images while the vehicle is traversing one or more street locations within a geographic region. The collection of images can include, for example, multiple distinct photographic images and/or sequence(s) of images from a video. In some implementations, such images are geotagged with one or more geographic identifiers descriptive of a geographic location associated with the camera at the time it captured each image.

In some implementations, the image content analysis engine can store, include or access one or more machine-learned image content analysis models. For example, the image content analysis models can be or can otherwise include various machine-learned models such as neural networks (e.g., feed-forward networks, recurrent neural networks, convolutional neural networks, etc.) or other multi-layer non-linear models, regression-based models or the like.

The machine-learned image content analysis model(s) can have been trained to detect text and/or logos associated with a brand within each image of a collection of images associated with the geographic area. In some implementations, a machine-learned image content analysis model can have been trained to implement a text transcription identification and/or a logo matching identification. For example, text transcription and/or logos can be matched to text and/or logo options identified in predetermined dataset of text transcription and/or logo options (e.g., names of text and/or logos associated with a particular type of label (e.g., names of vehicle makes)).

In some implementations, the brand can be associated with a particular category of goods (e.g., vehicles, business entity types, vendor payment types, apparel, shoes, etc.). More particularly, in some examples, the image content analysis engine can be configured to determine each detection of the brand from the images captured at the one or more sites from an entity storefront appearing within the images. Brand detection in entity storefront examples can include but are not limited to a brand name associated with the entity itself (e.g., types of fast food stores, convenience stores, gas stations, grocery stores, pharmacies, or other types of business entities), vendor payment types associated with the entity (e.g., detection of names and/or logos indicating that the entity will accept payment from one or more respective credit card companies or the like), etc. In other examples, the image content analysis engine can be configured to determine the detection of the brand from the images captured at the one or more sites from a vehicle appearing within the images. In other examples, the image content analysis engine can be configured to determine the detection of the brand from the images captured at one or more sites from one or more billboard(s) appearing within the images. It should be appreciated that the subject systems and methods could be applied to these and many other examples of images and brands while remaining within the spirit and scope of the disclosed technology.

Referring still to example aspects of an image content analysis engine, the machine-learned image content analysis model can be configured to receive each image in the collection of images as input to the machine-learned image content analysis model. In response to receipt of the collection of images, the machine-learned image content analysis model can be configured to generate output data associated with detections of one or more brands appearing within the images. For example, the machine-learned content analysis model can be configured to generate a bounding box associated with each detected brand. Output data can additionally or alternatively include one or more labels associated with each detected brand, each label providing a semantic tag associated with some aspect of the brand (e.g., the brand name and/or one or more categories of goods associated with a brand). In the example of a vehicle detected within an image, one or more labels associated with the detected vehicle could include a vehicle model label (e.g., Camry), a vehicle make label (e.g., Toyota), a vehicle class label (e.g., sedan), a vehicle color label (e.g., white), or other identifiers. In some implementations, the output data can additionally or alternatively include a confidence score descriptive of a probability that the detected brand is correctly detected within that bounding box. Such output data can be aggregated over the collection of images to determine a count descriptive of the number of detections of the brand within the geographic region or within specific sub-regions thereof.

In some implementations, a brand penetration index generation system can be configured to generate a brand penetration index for each sub-region. In some implementations, the brand penetration index is based on the number of detections of the brand in the respective sub-region. In some implementations, a count descriptive of the number of detections of the brand can be weighted by one or more factors including but not limited to: a population factor based on a population within the sub-region; a category factor based on a category of goods associated with the brand; a source factor based on a number of source locations for a brand within a sub-region (e.g., dealerships, stores, etc.). In some implementations, the brand penetration index can correspond to or be used to determine other variables representative of brand capacity (e.g., a total number of all brands detected in an area or a total number of possible detections based on population within an area) and/or brand saturation (e.g., an amount or index of detections of similar brands in the area). In some implementations, the brand penetration index can be determined as a representation of brand prominence in a particular category (e.g., number of detections of vehicle make/model in a category such as sedans, luxury cars, all cars, etc.).

In some implementations, the brand penetration index generation system can be configured to refine the number of detections of a brand by de-duplicating multiple detections associated with a distinct geographic location. Such a refining process can help increase accuracies and usefulness within the disclosed techniques while making the disclosed systems and methods more immune to potential disparities and differences that can be associated with a large imagery corpus for determining brand detections. For example, refining can help reduce an amount of potential bias that could come in the form of some portions of a geographic area being more prominent than others.

In some implementations, potential disparities of brand detections can arise due to differences in a total number of images available at different locations (e.g., affected by the speed of the operator, vehicle or human, that took the photos), differences in the times, circumstances, and weather patterns existing when images were taken, and the visibility viewshed of each brand object.

These problems, however, can be consistently solved by refining brand detection data using knowledge of the operator/vehicle routes, the times that the images were taken, the geolocation and pose information from each image as well as the detection box within an image for each detection. Then, it becomes possible to de-duplicate the obtained detections as each detection box can be associated with a well-defined real world location and the number of distinct locations associated with detections within a sub-region can be counted.

Another possible concern about some brand occurrences, especially for vehicles, is that they may not necessarily be associated with the people living in a given geographic area. This, however, is not expected to be a significant source of error as most travel is local and should dominate the overall corpus of obtained imagery detections. However, in some scenarios, it may be a desirable outcome to include all detections, whether based on people/homes/vehicles/etc. that are local to the area or that are simply traveling through it.

According to another aspect of the present disclosure, the computing system can be configured to store the brand penetration index generated for each sub-region in a regional brand penetration database. The regional brand penetration database can correspond, for example, to a memory including one or more tangible, non-transitory, computer-readable media or other suitable computer program product(s). In some implementations, the brand penetration index for each sub-region can be stored in the regional brand penetration database in associated with an indicator of the respective sub-region. In some implementations, the brand penetration indices for a plurality of sub-regions can be ordered within the brand penetration database such that the sub-regions or corresponding indices are stored in a manner indicating the most dominated to least dominated sub-regions (or vice versa) according to one or more measures of brand penetration.

In some implementations, the brand penetration index generation system can track how index values stored within the regional brand penetration system database change over time. For example, the brand penetration index generation system can be configured to determine a shift factor indicative of one or more dynamic shifts in the brand penetration index for each sub-region over one or more periods of time. The system can be configured to generate flags, notifications, and/or automated system adjustments when a determined shift factor exceeds predetermined threshold levels. These shift factors and associated notifications can be used to help identify successful brand penetration or areas in which more targeted brand penetration is desired.

According to another aspect of the present disclosure, in some implementations, the computing system can also include a targeted advertisement system coupled to the regional brand penetration database and to an electronic content database. The targeted advertisement system can be configured to determine an electronic content item from the electronic content database. The electronic content item can be associated with the brand based at least in part on the brand penetration index for a given sub-region of the two or more sub-regions. The electronic content item can be configured for delivery to and display on an electric device associated with the given sub-region. For example, an electronic device associated with a sub-region could correspond to an electronic device operating with an IP address or other identifier associated with a physical address located within the sub-region. In other examples, an electronic device associated with a sub-region could correspond to an electronic device owned by a user living in the sub-region or that is currently being operated in the sub-region (as may be the case with mobile computing devices or the like).

According to another aspect of the present disclosure, in some implementations, the computing system can also include reverse geocoding features that can help determine physical addresses for serving brand content to users in physical manner as opposed to a an electronic manner. More particularly, the brand penetration determination system and/or targeted advertisement system can more particularly include a reverse geocoding system configured to map cells corresponding to sub-regions within a geographic area to physical addresses within those cells/sub-regions. The reverse geocoding system can leverage databases and/or systems that map various geographic coordinates (e.g., latitude and longitude values) associated with cells/sub-regions to physical addresses within or otherwise associated with those areas. These physical addresses can be stored in memory (e.g., in the regional brand penetration database) along with other indicators of the respective cells/sub-regions and corresponding determined brand penetration indices. Measures of brand penetration determined for particular cells/sub-regions can then be used to determine content items (e.g., targeted advertisement mailings) for selected delivery to physical addresses within those cells/sub-regions.

By utilizing the disclosed brand penetration index in dynamically determining or adjusting electronic content delivered to users, advertisers can more accurately target products to the most suitable audience. More particularly, electronic content can be strategically determined for delivery to users within geographic areas having a below-average penetration of a particular brand and/or above-average penetration of competing brands. In some implementations, the further analytics implemented by a targeted advertisement system can determine penetration measures in terms of one or more variables such as but not limited to various threshold levels of brand penetration.

The systems and methods described herein may provide a number of technical effects and benefits. For instance, a computing system can include a brand penetration determination system that generates meaningful object detection data associated with a large corpus of collected imagery. More particularly, detection of brands associated with goods, services, and/or the like within images can be correlated to statistically relevant measures of brand indices representative of brand capacity, brand prominence, brand saturation, etc. in a computationally feasible manner. In addition, these measures of brand penetration can be advantageously tracked and aggregated over space (e.g. various geographic regions) and time (e.g., various windows—times of day, days of the week, months of the year, etc.) to determine additional or alternative data measures.

A further technical effect and benefit of the disclosed technology concerns the integration of a geographic sub-region determination system, which can be configured to determine numbers and/or boundaries of sub-regions within a geographic area so as to ensure that a population within each sub-region is above a threshold. By ensuring that the population of each sub-region is above that threshold, a computational burden imposed in storing statistically relevant brand indices for each sub-region is reduced. In addition, by ensuring that only brand indices for sub-regions having a statistically meaningful number of inhabitants are stored, the disclosed systems and methods can provide useful data associated with an imagery corpus while simultaneously minimizing the costs of storing that data in memory. As such, specific improvements in computing technology can be achieved in accordance with the disclosed technology.

A still further technical effect and benefit of the disclosed technology can be realized when the disclosed technology is integrated within the application of a targeted advertisement system. Advertisers are commonly faced with the problem of determining how to accurately target product(s) and/or services to the most suitable audience. This problem can involve a large number of variables, where various demographics, cultural differences, infrastructure, and other considerations come into play. By providing systems and methods for generating computationally efficient and meaningful measures of geographic partitioning and corresponding brand penetration, such technology can be used, possibly in combination with other demographic indicators, to dynamically develop advertising strategies for targeted delivery of electronic content to consumers.

With reference now to the Figures, example embodiments of the present disclosure will be discussed in further detail.

FIG. 1 depicts a block diagram of an example computing system 100 for determining a measure of brand penetration across a geographic area, according to example embodiments of the present disclosure. In general, the computing system 100 can include a brand penetration determination system 102, a regional brand penetration database 110 and a targeted advertisement system 112. In some implementations, the regional brand penetration database 110 can correspond, for example, to a memory including one or more tangible, non-transitory, computer-readable media or other suitable computer program product(s).

In some implementations, the brand penetration determination system 102 and targeted advertisement system 112 and various components thereof can include computer logic utilized to provide desired functionality. The brand penetration determination system 102 and targeted advertisement system 112 can be implemented in hardware, firmware, and/or software controlling a general purpose processor. For example, in some implementations, the brand penetration determination system 102 and targeted advertisement system 112 can include program files stored on a storage device, loaded into a memory and executed by one or more processors. In other implementations, the brand penetration determination system 102 and targeted advertisement system 112 includes one or more sets of computer-executable instructions that are stored in a tangible computer-readable storage medium such as RAM hard disk or optical or magnetic media.

Referring more particularly to FIG. 1, brand penetration determination system 102 can be configured to determine a measure of brand penetration across a geographic region. In some implementations, the brand penetration determination system 102 can include a geographic sub-region determination system 104, an image content analysis engine 106, and/or a brand penetration index generation system 108.

In some implementations, geographic sub-region determination system 104 can be configured to split a geographic area into two or more sub-regions. Sub-regions can correspond, for example, to discretized cells within the geographic region that can have predetermined or dynamically determined sizes and/or boundaries based on one or more desired measures of brand penetration. For example, in some implementations, the brand penetration determination system 102 can be configured to determine, in splitting the geographic area into two or more sub-regions, the boundaries of each sub-region according to one or more of a particular cell size and/or a particular geographic partitioning. For example, one method of partitioning a geographic area into sub-regions could correspond to implementation of a grid imposed over the geographic area. In some implementations, each cell in the grid can be characterized by a given shape (e.g., a square, rectangle, circle, pentagon, hexagon, or other polygon). In some implementations, each cell in the grid can be characterized by one or more dimensions (e.g., a width, length, height, and/or diameter dimension) having a predetermined or dynamically determined distance (e.g., a value measured in meters, kilometers, miles, or other suitable variable). In some implementations, a grid of cells corresponding to respective sub-regions can be uniform in size, while the cells can vary in size in other embodiments.

In some implementations, the geographic sub-region determination system 104 can be configured to determine, in splitting the geographic area into two or more sub-regions, the number of sub-regions and the boundaries of each sub-region so as to ensure that the population within each sub-region is above a threshold. By ensuring that the population of each sub-region is above that threshold, a computational burden imposed in storing useful brand indices for each region is reduced.

When sub-region boundaries are uniform in size (e.g., as in the form of a uniform grid of cells) or when they are predetermined in size (e.g., corresponding to predetermined geographic partitions such as those corresponding to zip codes, neighborhood boundaries, town/district boundaries, state boundaries, country boundaries, etc.), the number of sub-regions can be reduced by excluding sub-regions whose population does not exceed the threshold.

In some implementations, population as described herein can correspond to a number of people within a given geographic area, such as determined from census data or other predefined databases associated with a geographic area. In this example, when ensuring that the population within each sub-region is above a threshold, the geographic sub-region determination system 104 can determine the number and/or boundaries of each sub-region such that each sub-region has a population defined by a threshold corresponding to a number (x) of people in each sub-region.

Referring still to the geographic sub-region determination system 104, in other implementations, population as described herein can correspond to a determined number of goods associated with people in a given geographic area—for example, a number of homes, vehicles, businesses, electronic devices or particular categories or subsets of such goods. In this example, when ensuring that the population within each sub-region is above a threshold, the geographic sub-region determination system 104 can determine the number and/or boundaries of each sub-region such that each sub-region has a population defined by a threshold corresponding to a number (y) of goods (e.g., homes, vehicles, businesses, electronic devices, etc.) in each sub-region.

Referring still to the geographic sub-region determination system 104, in other implementations, population as described herein can correspond to a determined number of images obtained for sites within a particular geographic area and/or a number of detections of goods, entities, or the like within such images. In this example, when ensuring that the population within each sub-region is above a threshold, the geographic sub-region determination system 104 can determine the number and/or boundaries of each sub-region such that each sub-region has a population defined by a threshold corresponding to a number (z) of images and/or detected objects within the images in each sub-region.

By partitioning a geographic area into sub-regions such that the size of sub-regions is dynamically determined based on population density (or corresponding density of brand detections), the likelihood of including cells corresponding to sub-regions having little to no population of brand detections is reduced. This is accomplished at least in part by avoiding a scenario in which there are numerous sub-regions having associated brand indices, but where each sub-region has such a small number of inhabitants that the data from those sub-regions is not statistically relevant. Similarly, the size of cells within sub-regions having a greater number of brand detections can be determined so as to help ensure an appropriate size to maintain distinctions within a distribution level of brand detections. This can help ensure that meaningful brand penetration measures can be determined for a geographic area. As such, cell size can vary based on different regions. For example, cell size can be smaller in urban locations and can get progressively larger when transitioning from urban areas into suburban areas and into rural areas.

Figure 2:
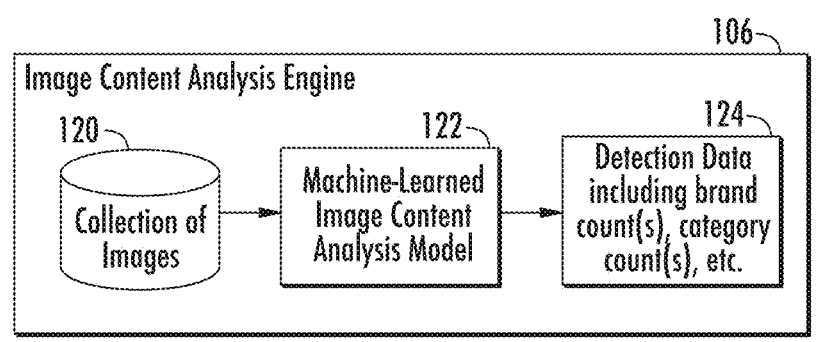
FIG. 2 depicts a block diagram of an example image content analysis engine, according to example embodiments of the present disclosure.

In some implementations, an image content analysis engine 106 can be configured to determine, from images captured at one or more sites within each sub-region, a number of detections of a brand within each respective sub-region. In some embodiments, the images captured at one or more sites can include a substantially large collection of images 120 as depicted in FIG. 2. In some embodiments, the collection of images 120 can have been captured at one or more sites within each sub-region by a camera operating at street level. For example, the camera operating at street level can be mounted on a vehicle and configured to obtain the collection of images 120 while the vehicle is traversing one or more street locations within a geographic region. The collection of images 120 can include, for example, multiple distinct photographic images and/or sequence(s) of images from a video. In some implementations, the collection of images 120 are geotagged with one or more geographic identifiers descriptive of a geographic location associated with the camera at the time it captured each image.

In some implementations, the image content analysis engine 106 can store, include or access one or more machine-learned image content analysis models 122. For example, the image content analysis models 122 can be or can otherwise include various machine-learned models such as neural networks (e.g., feed-forward networks, recurrent neural networks, convolutional neural networks, etc.) or other multi-layer non-linear models, regression-based models or the like.

The machine-learned image content analysis model(s) 122 can have been trained to detect text and/or logos associated with a brand within each image of the collection of images 120 associated with the geographic area. In some implementations, a machine-learned image content analysis model 122 can have been trained to implement a text transcription identification and/or a logo matching identification. For example, text transcription and/or logos can be matched to text and/or logo options identified in predetermined dataset of text transcription and/or logo options (e.g., names of text and/or logos associated with a particular type of label (e.g., names of vehicle makes)).

In some implementations, the brand can be associated with a particular category of goods (e.g., vehicles, business entity types, vendor payment types, apparel, shoes, etc.). More particularly, in some examples, the image content analysis engine 106 can be configured to determine each detection of the brand from the collection of images 120 captured at the one or more sites from an entity storefront appearing within the images. Brand detection in entity storefront examples can include but are not limited to a brand name associated with the entity itself (e.g., types of fast food stores, convenience stores, gas stations, grocery stores, pharmacies, or other types of business entities), vendor payment types associated with the entity (e.g., detection of names and/or logos indicating that the entity will accept payment from one or more respective credit card companies or the like), etc. In other examples, the image content analysis engine 106 can be configured to determine the detection of the brand from the images captured at the one or more sites from a vehicle appearing within the collection of images 120. In other examples, the image content analysis engine 106 can be configured to determine the detection of the brand from the collection of images 120 captured at one or more sites from one or more billboard(s) appearing within the images. It should be appreciated that the subject systems and methods could be applied to these and many other examples of images and brands while remaining within the spirit and scope of the disclosed technology.

Referring still to example aspects of an image content analysis engine 106 as depicted in FIG. 2, the machine-learned image content analysis model 122 can be configured to receive each image in the collection of images 120 as input to the machine-learned image content analysis model 122. In response to receipt of the collection of images 120, the machine-learned image content analysis model 122 can be configured to generate output data 124 (e.g., detection data) associated with detections of one or more brands appearing within the images. For example, the machine-learned content analysis model 122 can be configured to generate a bounding box associated with each detected brand. Output data 124 can additionally or alternatively include one or more labels associated with each detected brand, each label providing a semantic tag associated with some aspect of the brand (e.g., the brand name and/or one or more categories of goods associated with a brand). In the example of a vehicle detected within an image, one or more labels associated with the detected vehicle could include a vehicle model label (e.g., Camry), a vehicle make label (e.g., Toyota), a vehicle class label (e.g., sedan), a vehicle color label (e.g., white), or other identifiers. In some implementations, the output data 124 can additionally or alternatively include a confidence score descriptive of a probability that the detected brand is correctly detected within that bounding box. Such output data 124 can be aggregated over the collection of images to determine a count descriptive of the number of detections of the brand within the geographic region or within specific sub-regions thereof.

Referring again to FIG. 1, brand penetration index generation system 108 can be configured to generate a brand penetration index for each sub-region. In some implementations, the brand penetration index is based on the number of detections of the brand in the respective sub-region. In some implementations, a count descriptive of the number of detections of the brand can be weighted by one or more factors including but not limited to: a population factor based on a population within the sub-region; a category factor based on a category of goods associated with the brand; a source factor based on a number of source locations for a brand within a sub-region (e.g., dealerships, stores, etc.). In some implementations, the brand penetration index can correspond to or be used to determine other variables representative of brand capacity (e.g., a total number of all brands detected in an area or a total number of possible detections based on population within an area) and/or brand saturation (e.g., an amount or index of detections of similar brands in the area). In some implementations, the brand penetration index can be determined as a representation of brand prominence in a particular category (e.g., number of detections of vehicle make/model in a category such as sedans, luxury cars, all cars, etc.).

In some implementations, the brand penetration index generation system 108 can be configured to refine the number of detections of a brand by de-duplicating multiple detections associated with a distinct geographic location. Such a refining process can help increase accuracies and usefulness within the disclosed techniques while making the disclosed systems and methods more immune to potential disparities and differences that can be associated with a large imagery corpus for determining brand detections. For example, refining can help reduce an amount of potential bias that could come in the form of some portions of a geographic area being more prominent than others.

In some implementations, potential disparities of brand detections can arise due to differences in a total number of images available at different locations (e.g., affected by the speed of the operator, vehicle or human, that took the photos), differences in the times, circumstances, and weather patterns existing when images were taken, and the visibility viewshed of each brand object.

These problems, however, can be consistently solved by refining brand detection data using knowledge of the operator/vehicle routes, the times that the images were taken, the geolocation and pose information from each image as well as the detection box within an image for each detection. Then, it becomes possible to de-duplicate the obtained detections as each detection box can be associated with a well-defined real world location and the number of distinct locations associated with detections within a sub-region can be counted.

Another possible concern about some brand occurrences, especially for vehicles, is that they may not necessarily be associated with the people living in a given geographic area. This, however, is not expected to be a significant source of error as most travel is local and should dominate the overall corpus of obtained imagery detections. However, in some scenarios, it may be a desirable outcome to include all detections, whether based on people/homes/vehicles/etc. that are local to the area or that are simply traveling through it.

According to another aspect of the present disclosure, the computing system 100 can be configured to store the brand penetration index generated for each sub-region in a regional brand penetration database 110. The regional brand penetration database 110 can correspond, for example, to a memory including one or more tangible, non-transitory, computer-readable media or other suitable computer program product(s). In some implementations, the brand penetration index for each sub-region can be stored in the regional brand penetration database 110 in associated with an indicator of the respective sub-region. In some implementations, the brand penetration indices for a plurality of sub-regions can be ordered within the regional brand penetration database 110 such that the sub-regions or corresponding indices are stored in a manner indicating the most dominated to least dominated sub-regions (or vice versa) according to one or more measures of brand penetration.

In some implementations, the brand penetration index generation system 108 can track how index values stored within the regional brand penetration system database 110 change over time. For example, the brand penetration index generation system 108 can be configured to determine a shift factor indicative of one or more dynamic shifts in the brand penetration index for each sub-region over one or more periods of time. The brand penetration determination system 102 can be configured to generate flags, notifications, and/or automated system adjustments when a determined shift factor exceeds predetermined threshold levels. These shift factors and associated notifications can be used to help identify successful brand penetration or areas in which more targeted brand penetration is desired.

According to another aspect of the present disclosure, in some implementations, the computing system 100 can also include a targeted advertisement system 112 coupled to the regional brand penetration database 110 and to an electronic content database 114. An advertisement determination system 116 of targeted advertisement system 112 can be configured to determine an electronic content item from the electronic content database 114. The electronic content item can be associated with the brand based at least in part on the brand penetration index for a given sub-region of the two or more sub-regions. An advertisement delivery system 118 of the targeted advertisement system 112 can be configured to deliver the electronic content item for display on an electric device associated with the given sub-region. For example, an electronic device associated with a sub-region could correspond to an electronic device operating with an IP address or other identifier associated with a physical address located within the sub-region. In other examples, an electronic device associated with a sub-region could correspond to an electronic device owned by a user living in the sub-region or that is currently being operated in the sub-region (as may be the case with mobile computing devices or the like).

Figure 3:
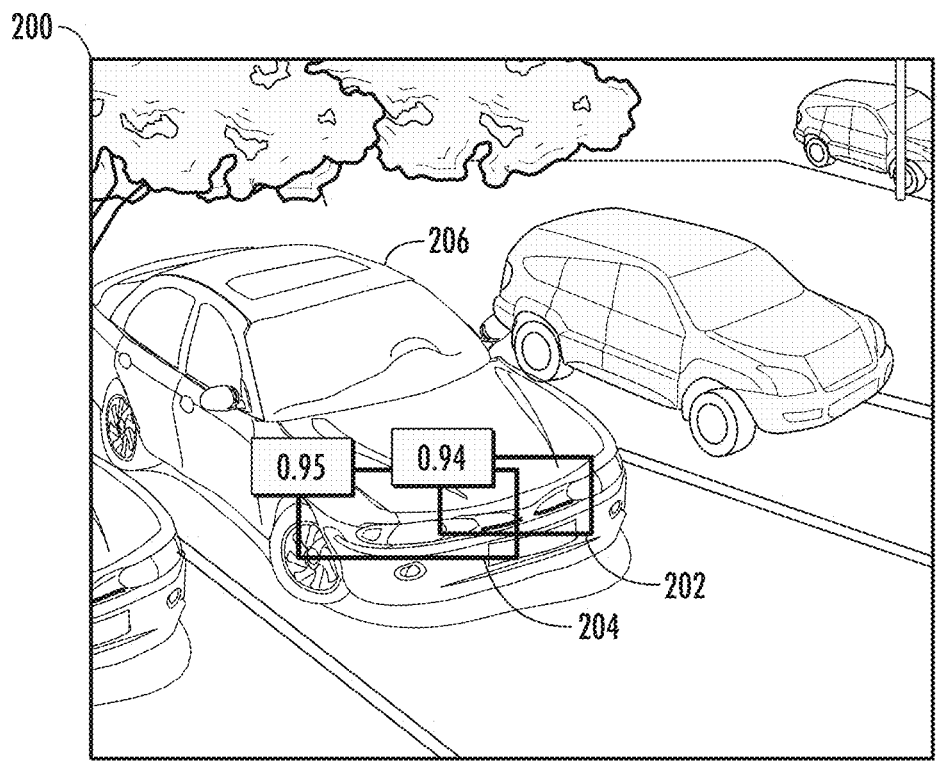
FIG. 3 depicts a first aspect of example analysis implemented by an image content analysis engine, according to example embodiments of the present disclosure.
Figure 4:
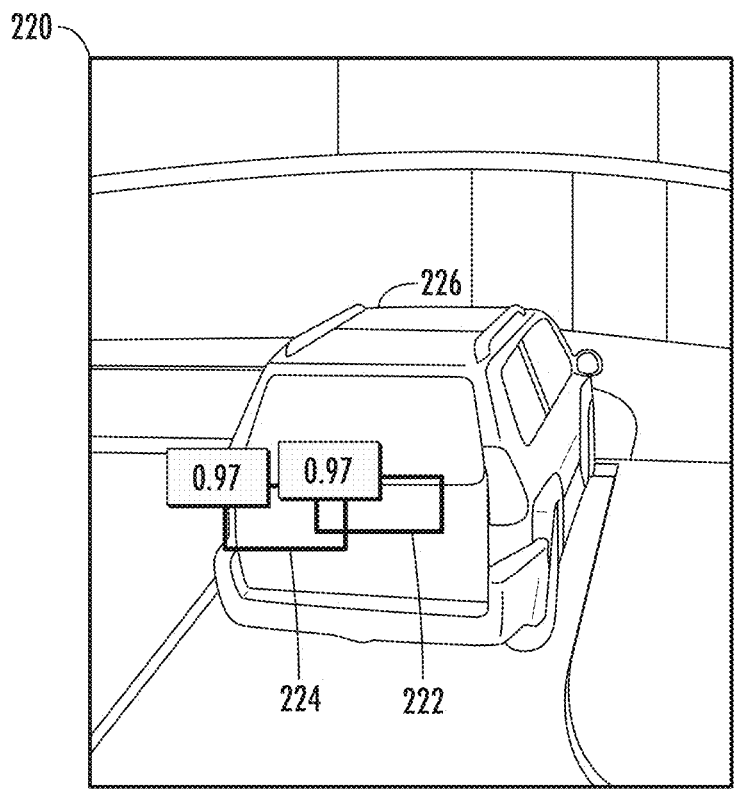
FIG. 4 depicts a second aspect of example analysis implemented by an image content analysis engine, according to example embodiments of the present disclosure.

FIGS. 3-4 depict various example aspects of analysis implemented by an image content analysis engine, according to example embodiments of the present disclosure. More particularly, FIGS. 3-4 provide respective graphical representations of an example image (e.g., an image within the collection of images 120 of FIG. 2) and an example portion of output data 124 such as generated by a machine-learned image content analysis model 122.

More particularly, with reference to FIG. 3, an example image within the collection of images 120 can correspond to example image 200. Image 200 can be provided as input to a machine-learned content analysis model (e.g., machine-learned image content analysis model 122 of FIG. 2) that has been trained to generate output data associated with detected vehicle brands. As such, example output data 124 generated by a machine-learned image content analysis model 122 in response to receipt of image 200 as input, could correspond to a first bounding box 202 and second bounding box 204 associated with detection of vehicle 206. The first and second bounding boxes 202, 204 can also have associated labels and/or confidence scores associated with them. For example, bounding box 202 could represent a portion of image 200 that machine-learned image content analysis model has determined includes a sedan with a likelihood represented by a confidence score of 0.95 or 95%. Bounding box 204 could represent a portion of image 200 that machine-learned image content analysis model has determined includes a Toyota logo with a likelihood represented by a confidence score of 0.94 or 94%.

With more particular reference to FIG. 4, an example image within the collection of images 120 can correspond to example image 220. Image 220 can be provided as input to a machine-learned content analysis model (e.g., machine-learned image content analysis model 122 of FIG. 2) that has been trained to generate output data associated with detected vehicle brands. As such, example output data 124 generated by a machine-learned image content analysis model 122 in response to receipt of image 220 as input, could correspond to a first bounding box 222 and second bounding box 224 associated with detection of vehicle 226. The first and second bounding boxes 222, 224 can also have associated labels and/or confidence scores associated with them. For example, bounding box 222 could represent a portion of image 220 that machine-learned image content analysis model has determined includes a sports utility vehicle with a likelihood represented by a confidence score of 0.97 or 97%. Bounding box 224 could represent a portion of image 220 that machine-learned image content analysis model has determined includes text transcription corresponding to the "Lexus" brand with a likelihood represented by a confidence score of 0.97 or 97%.

Figure 5:
FIG. 5 depicts a first visual representation of an example measure of regional brand penetration, according to example embodiments of the present disclosure.

With more particular reference to FIG. 5, an example image within the collection of images 120 can correspond to example image 220. Image 220 can be provided as input to a machine-learned content analysis model (e.g., machine-learned image content analysis model 122 of FIG. 2) that has been trained to generate output data associated with detected computer brands or brands of other goods associated with an office. As such, example output data 124 generated by a machine-learned image content analysis model 122 in response to receipt of image 240 as input, could correspond to a first bounding box 222 and second bounding box 224 associated with detection of vehicle 226. The first and second bounding boxes 222, 224 can also have associated labels and/or confidence scores associated with them. For example, bounding box 222 could represent a portion of image 220 that machine-learned image content analysis model has determined includes a sports utility vehicle with a likelihood represented by a confidence score of 0.97 or 97%. Bounding box 224 could represent a portion of image 220 that machine-learned image content analysis model has determined includes text transcription corresponding to the "Lexus" brand with a likelihood represented by a confidence score of 0.97 or 97%.

Figure 6:
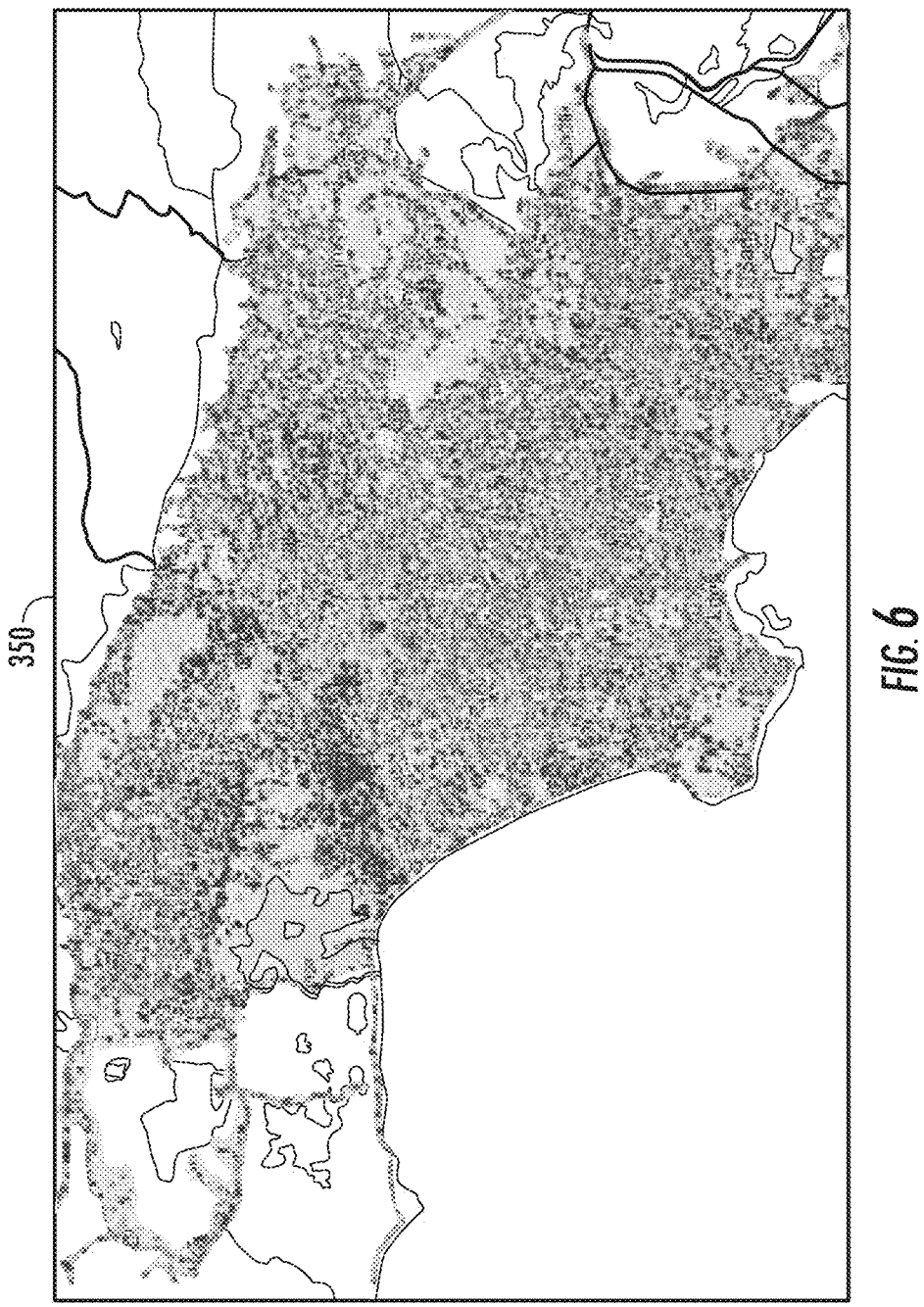
FIG. 6 depicts a second visual representation of an example measure of regional brand penetration, according to example embodiments of the present disclosure.

FIGS. 5-6 depict various example aspects of analysis implemented by a brand penetration index determination system, according to example embodiments of the present disclosure. More particularly, FIGS. 5-6 provide respective graphical representations of example brand penetration indices and associated data such as could be generated by a brand penetration determination system 102 of FIG. 1. More particularly, FIGS. 5-6 provide respective graphical representations 300/350 of brand penetration data associated with detections of different vehicle brands in a particular geographic area. For example, the graphical representation 300 of FIG. 5 visually depicts a normalized map view of detections of a first brand of vehicles (e.g., Toyota sedans) within a given geographic area, while graphical representation 350 of FIG. 6 visually depicts a normalized map view of detections of a second brand of vehicles (e.g., Lexus sedans) in the same geographic area as FIG. 5. The normalized map view of detections depicted in FIGS. 5-6 can be normalized, for example, by considering the total number of detections of sedans within the geographic area.

Figure 7:
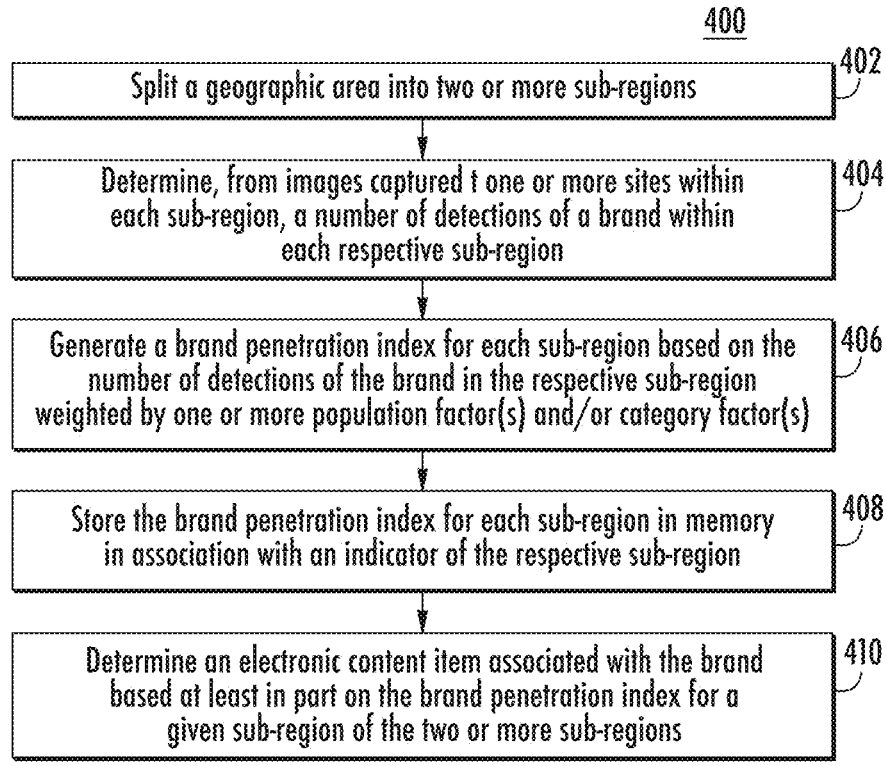
FIG. 7 depicts a flow chart diagram of an example method to determine a measure of brand penetration across a geographic area, according to example embodiments of the present disclosure.

FIG. 7 depicts a flow chart diagram of an example method to determine a measure of brand penetration across a geographic area according to example embodiments of the present disclosure. Although FIG. 7 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure. In some embodiments, various steps of the method 400 can be performed by one or more computing systems (e.g., computing system 100 of FIG. 1, client computing device 602 of FIG. 10, and/or server computing system 630 of FIG. 10.

At 402, a computing system including one or more computing devices, processors, or the like can split a geographic area into two or more sub-regions. In some implementations, in splitting the geographic area into two or more sub-regions at 402, the computing system can determine the boundaries of each sub-region according to one or more of a predetermined cell size and/or a predetermined geographic partitioning. In some implementations, in splitting the geographic area into two or more sub-regions at 402, the computing system can determine the number of sub-regions and one or more boundaries of each sub-region so as to ensure that a population within each sub-region is above a threshold. In some implementations, the population can correspond to a number of people within a given geographic area, such as determined from census data or other pre-defined databases associated with a geographic area. In other implementations, the population can correspond to a determined number of goods associated with people in a given geographic area—for example, a number of homes, vehicles, businesses, electronic devices or particular categories or subsets of such goods. In other implementations, the population can correspond to a determined number of images obtained for sites within a particular geographic area and/or a number of detections of goods, entities, or the like within such images.

At 404, the computing system can determine, from images captured at one or more sites within each sub-region, a number of detections of a brand within each respective sub-region. In some implementations, the images captured at one or more sites within each sub-region are images captured by a camera operating at street level. In some implementations, determining a number of brand detections at 404 can include one or more of text transcription and/or logo matching to portions of images. For example, detections of brands can be determined from vehicles, entity storefronts, billboards, or other locations appearing within the images. In some implementations, determining a number of detections of a brand at 404 can include de-duplicating multiple detections associated with a distinct geographic location. In some implementations, determining a number of detections of a brand at 404 can be more particularly determined according to steps in the example method 450 depicted in FIG. 10.

At 406, the computing system can generate a brand penetration index for each sub-region based on the number of detections of the brand in the respective sub-region. In some implementations, the brand penetration index generated at 406 can be weighted by one or more factors. For instance, in some implementations, the brand penetration index generated at 406 can be weighted by one or more of a population factor, a category factor, and a source factor. A population factor used in generating a brand penetration index at 606 can be based on a population within each sub-region (e.g., of people, of images, of goods, of detections, etc.), while a category factor can be based on a category of goods associated with the brand, and a source factor can be based on a number of source locations for a brand within a sub-region (e.g., dealerships, stores, etc.). In some implementations, the brand penetration index generated at 406 can correspond to or be used to determine other variables representative of brand capacity (e.g., a total number of all brands detected in an area or a total number of possible detections based on population within an area) and/or brand saturation (e.g., an amount or index of detections of similar brands in the area). In some implementations, the brand penetration index generated at 406 can be determined as a representation of brand prominence in a particular category (e.g., number of detections of vehicle make/model in a category such as sedans, luxury cars, all cars, etc.).

At 408, the computing system can store the brand penetration index for each sub-region in memory in association with an indicator of the respective sub-region. In some implementations, the memory can include one or more tangible, non-transitory computer-readable media such as embodied by a regional brand penetration database 110 depicted in FIG. 1. By tracking changes of brand penetration indices stored in memory over time, the computing system can also determine a shift factor indicative of one or more dynamic shifts in the brand penetration index for each sub-region over one or more periods of time.

At 410, the computing system can determine and deliver an electronic content item associated with the brand. The electronic content item can be determined, for example, based at least in part on the brand penetration index for a given sub-region of the two or more sub-regions. The computing system can deliver the electronic content item configured for display to an electronic device associated with the given sub-region.

Figure 8:
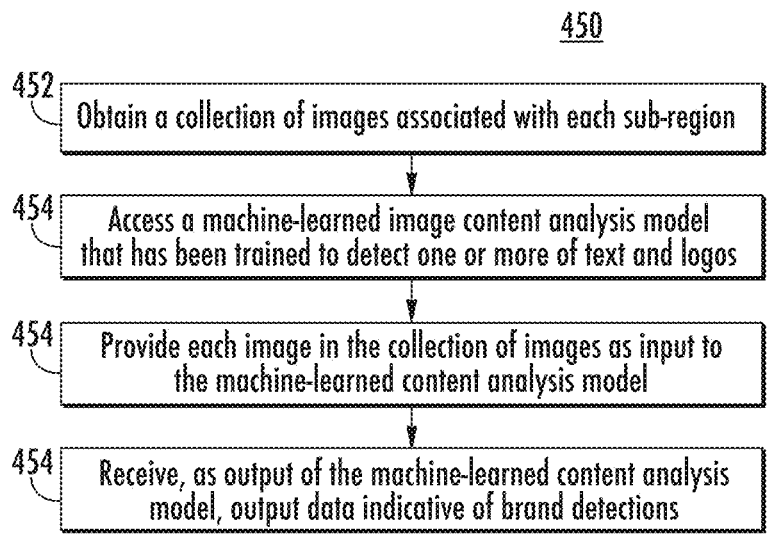
FIG. 8 depicts a flow chart diagram of an example method for determining a number of detections of a brand within a geographic region, according to example embodiments of the present disclosure.

FIG. 8 depicts a flow chart diagram of an example method for determining a number of detections of a brand within a geographic region according to example embodiments of the present disclosure. Although FIG. 8 depicts steps performed in a particular order for purposes of illustration and discussion, the methods of the present disclosure are not limited to the particularly illustrated order or arrangement. The various steps of the method 450 can be omitted, rearranged, combined, and/or adapted in various ways without deviating from the scope of the present disclosure. In some embodiments, various steps of the method 450 can be performed by one or more computing systems (e.g., computing system 100 of FIG. 1, client computing device 602 of FIG. 10, and/or server computing system 630 of FIG. 10.

At 452, a computing system including one or more computing devices, processors, or the like can obtaining a collection of images associated with the respective sub-region. At 454, the computing system can access a machine-learned image content analysis model that has been trained to detect one or more of text and logos associated with the brand within each image of the collection of images. At 456, the computing system can provide the collection of images as input to the machine-learned image content analysis model. At 458, the computing system can receive, as an output of the machine-learned image content analysis model, in response to receipt of the collection of images as input to the machine-learned image content analysis model, a count descriptive of the number of detections of the brand within the respective sub-region.

Figure 9:
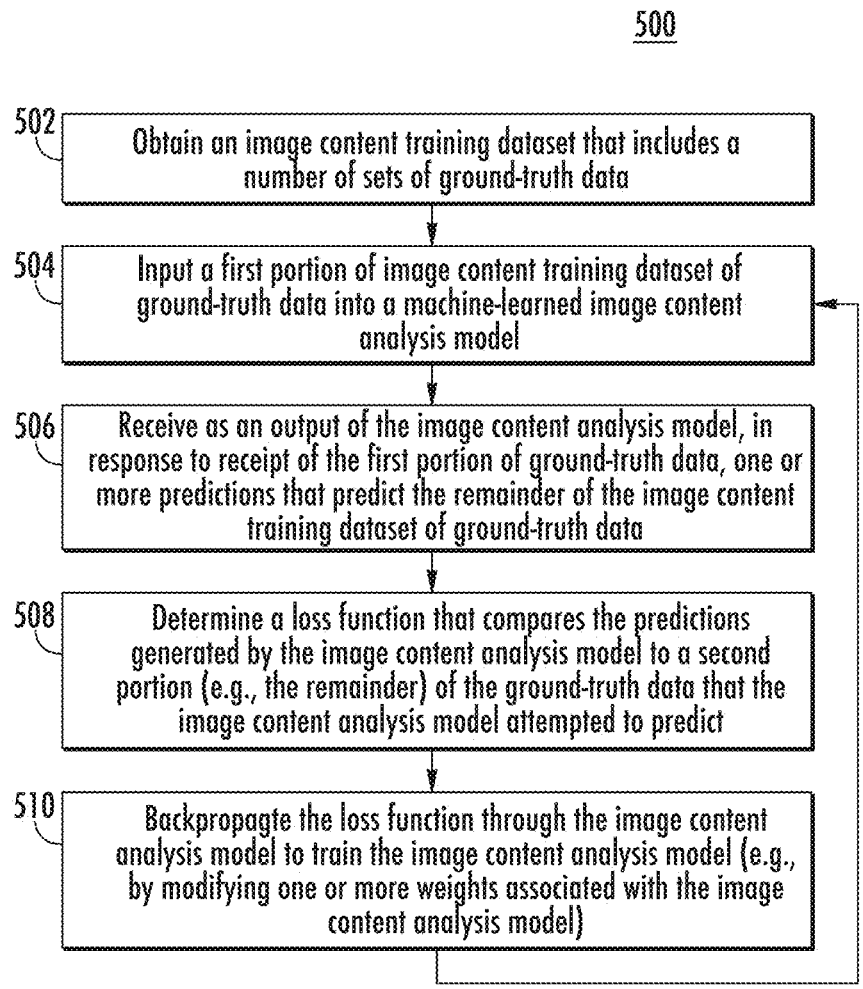
FIG. 9 depicts a flow chart diagram of an example method to train an image content analysis model, according to example embodiments of the present disclosure.

FIG. 9 depicts a flow chart diagram of an example method to train an image content analysis model according to example embodiments of the present disclosure. Although FIG. 9 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

Figure 10:
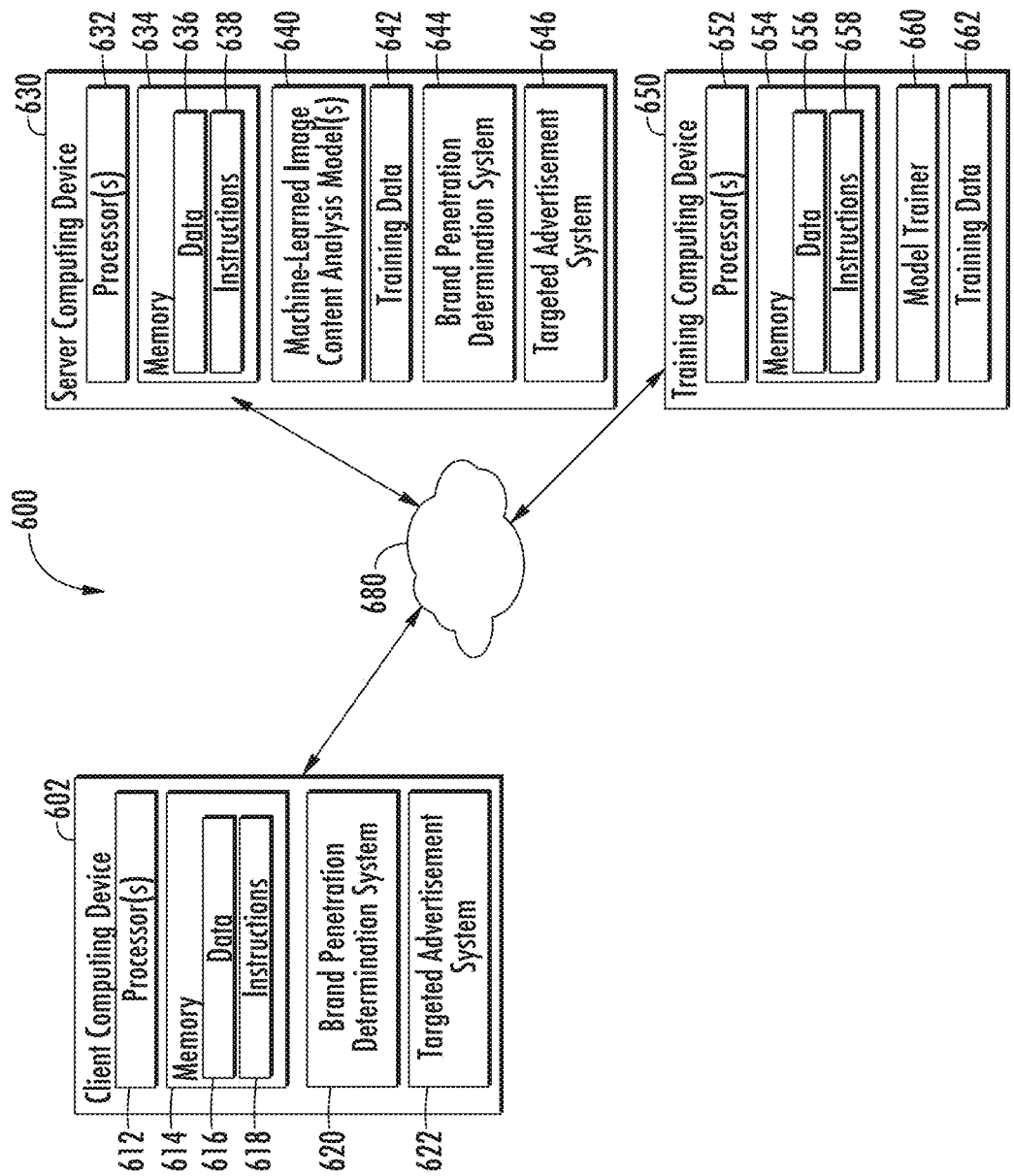
FIG. 10 depicts a block diagram of an example computing system, according to example embodiments of the present disclosure.

At 502, a computing system (e.g., training computing system 650 or other portion of computing system 600 of FIG. 10) can obtain an image content training dataset that includes a number of sets of ground-truth data. At 504, the computing system can provide a first portion of the image content training dataset of ground-truth data obtained at 502 as input into a machine-learned image content analysis model. At 506, the computing system can receive as an output of the image content analysis model, in response to receipt of the first portion of ground-truth data, one or more predictions that predict the remainder of the image content training dataset of ground-truth data. At 508, the computing system can determine a loss function that compares the predictions generated by the image content analysis model at 506 to a second portion (e.g., the remainder) of the ground-truth data that the image content analysis model attempted to predict. At 510, the computing system can backpropagate the loss function through the image content analysis model to train the image content analysis model (e.g., by modifying one or more weights associated with the image content analysis model). The steps depicted at 504-510 respectively can be repeated numerous times as part of training the image content analysis model in method 500.

FIG. 10 depicts a block diagram of an example computing system 600 that performs brand penetration determination according to example embodiments of the present disclosure. In particular, the computing system 600 can implement brand penetration determination including different specific components thereof and/or corresponding targeted advertising based on such brand penetration determination. The computing system 600 can include a client computing device 602, a server computing system 630, and a training computing system 650 that are communicatively coupled over a network 680.

The client computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the client computing device 602 to perform operations. In some implementations, memory 614 can include one or more portions of regional brand penetration database 110 of FIG. 1.

In some implementations, the client computing device 602 can store or include one or more of a brand penetration determination system 620 and/or targeted advertisement system 622. The brand penetration determination system 620 of FIG. 10 can correspond, for example, to brand penetration determination system 102 of FIG. 1, while targeted advertisement system 622 of FIG. 10 can correspond, for example, to targeted advertisement system 112 of FIG. 1. In some implementations, brand penetration determination system 620 can include one or more machine-learned content analysis models as described herein.

In some implementations, the one or more portions of the brand penetration determination system 620 and/or targeted advertisement system 622 can be received from the server computing system 630 over network 680, stored in the client computing device memory 614, and then used or otherwise implemented by the one or more processors 612.

Additionally or alternatively, one or more one or more portions of the brand penetration determination system 620 and/or targeted advertisement system 622 can be included in or otherwise stored and implemented by the server computing system 630 that communicates with the client computing device 602 according to a client-server relationship. For example, the brand penetration determination system 620 and/or targeted advertisement system 622 can be implemented by the server computing system 630 as a portion of a web service (e.g., a brand penetration determination service). Thus, one or more systems 620/622 can be stored and implemented at the client computing device 602 and/or one or more systems 644/646 can be stored and implemented at the server computing system 630.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations. In some implementations, memory 634 can include one or more portions of regional brand penetration database 110 of FIG. 1.

As described above, the server computing system 630 can store or otherwise include one or more portions of a brand penetration determination system 644 and/or targeted advertisement system 646. In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

In some implementations, the client computing device 602 and/or the server computing system 630 can train models (e.g., image content analysis models) provided within brand penetration determination systems 620/644 and/or targeted advertisement system 622/646 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models (e.g., an image content analysis model) stored at the client computing device 602 and/or the server computing system 630 using various training or learning techniques, such as, for example, backwards propagation of errors. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the image content analysis model or other models based on a set of training data 662. The training data 662 can include, for example, data provided as an input to the image content analysis models, and data provided as an output of the image content analysis models in response to the input data. The model trainer 660 can train the models in an unsupervised manner by using the input data and the output data of training data 662.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining a measure of brand penetration across a geographic area, the method comprising:
    splitting, by one or more computing devices, a geographic area into two or more sub-regions;
    obtaining, by the one or more computing devices, a collection of images associated with the two or more sub-regions;
    determining, by the one or more computing devices, based at least in part on output from a machine-learned image content analysis model trained to detect one or more of text and logos associated with the brand within each image of the collection of images associated with the two or more sub-regions, a number of detections of a brand within each respective sub-region;
    generating, by the one or more computing devices, a brand penetration index for each sub-region, wherein the brand penetration index is based on the number of detections of the brand in the respective sub-region; and
    storing, by the one or more computing devices, the brand penetration index for each sub-region in memory in association with an indicator of the respective sub-region.

2. The computer-implemented method as in claim 1, wherein, in splitting the geographic area into two or more sub-regions, the number of sub-regions and one or more boundaries of each sub-region are determined so as to ensure that a population within each sub-region is above a threshold.

3. The computer-implemented method of claim 1, wherein the determining, by the one or more computing devices, based at least in part on output from a machine-learned image content analysis model trained to detect one or more of text and logos associated with the brand within each image of the collection of images associated with the two or more sub-regions, a number of detections of a brand within each respective sub-region comprises:
    accessing, by the one or more computing devices, the machine-learned image content analysis model that has been trained to detect one or more of text and logos associated with the brand within each image of the collection of images;
    providing, by the one or more computing devices, the collection of images as input to the machine-learned image content analysis model; and
    receiving, by the one or more computing devices, as the output of the machine-learned image content analysis model, in response to receipt of the collection of images as input to the machine-learned image content analysis model, a count descriptive of the number of detections of the brand within the respective sub-region.

4. The computer-implemented method of claim 1, wherein the images captured at one or more sites within each sub-region are images captured by a camera operating at street level.

5. The computer-implemented method of claim 1, wherein the brand penetration index is based on the number of detections of the brand in the respective sub-region weighted by a number of detections of at least one category of goods associated with the brand.

6. The computer-implemented method of claim 1, wherein the brand penetration index is based on the number of detections of the brand in the respective sub-region weighted by a population factor, wherein the population factor is based on a population within the sub-region.

7. The computer-implemented method of claim 1, wherein determining from images captured at one or more sites within each sub-region a number of detections of a brand comprises refining, by the one or more computing devices, the number of detections of the brand by de-duplicating multiple detections associated with a distinct geographic location.

8. The computer-implemented method of claim 1, wherein, in splitting the geographic area into two or more sub-regions, the boundaries of each sub-region are defined according to one or more of a predetermined cell size and a predetermined geographic partitioning.

9. The computer-implemented method of claim 1, wherein each detection of the brand determined from the images captured at one or more sites is determined from an entity storefront appearing within the images.

10. The computer-implemented method of claim 1, wherein each detection of the brand determined from the images captured at one or more sites is determined from a vehicle appearing within the images.

11. The computer-implemented method of claim 1, further comprising determining, by the one or more computing devices, an electronic content item associated with the brand based at least in part on the brand penetration index for a given sub-region of the two or more sub-regions, wherein the electronic content item is configured for delivery to and display on an electric device associated with the given sub-region.

12. The computer-implemented method of claim 1, further comprising determining, by the one or more computing devices, a shift factor indicative of one or more dynamic shifts in the brand penetration index for each sub-region over one or more periods of time.

13. A computing system comprising:
   a geographic sub-region determination system configured to partition a geographic area into two or more sub-regions;
   a camera configured to obtain a collection of images associated with the two or more sub-regions;
   an image content analysis engine configured to determine, based at least in part on a machine-learned image content analysis model trained to detect one or more of text and logos associated with the brand within each image of the collection of images associated with the two or more sub-regions, a number of detections of a brand within each respective sub-region;
   a brand penetration index generation system configured to generate a brand penetration index for each sub-region, wherein the brand penetration index is based on the number of detections of the brand in the respective sub-region;
   wherein the geographic sub-region determination system is configured to determine, in splitting the geographic area into two or more sub-regions, the number of sub-regions and one or more boundaries of each sub-region so as to ensure that the population within each sub-region is above a threshold; and
   one or more tangible, computer-readable media configured to store the brand penetration index for each sub-region in association with an indicator of the respective sub-region.

14. The computing system according to claim 13, wherein the brand penetration index generation system is configured to refine the number of detections of a brand by de-duplicating multiple detections associated with a distinct geographic location.

15. The computing system according to claim 13, wherein the brand penetration index generation system is configured to determine, in splitting the geographic area into two or more sub-regions, the boundaries of each sub-region according to one or more of a predetermined cell size and a predetermined geographic partitioning.

16. The computing system according to claim 13, wherein the image content analysis engine is configured to determine each detection of the brand from the images captured at the one or more sites from one or more of a vehicle or an entity storefront appearing within the images.

17. The computing system according to claim 13, further comprising a targeted advertising system configured to determine an electronic content item associated with the brand based at least in part on the brand penetration index for a given sub-region of the two or more sub-regions, wherein the electronic content item is configured for delivery to and display on an electric device associated with the given sub-region.

18. The computing system according to claim 13, wherein the brand penetration index generation system is configured to determine a shift factor indicative of one or more dynamic shifts in the brand penetration index for each sub-region over one or more periods of time.

19. The computing system according to claim 13, wherein the brand penetration index is based on the number of detections of the brand in the respective sub-region weighted by one or more of a population factor based on a population within the sub-region or a number of detections of at least one category of goods associated with the brand.

20. One or more tangible, non-transitory, computer-readable media storing computer executable instructions that when executed by one or more processors cause the one or more processors to perform a method, the method comprising:
   splitting a geographic area into two or more sub-regions;
   obtaining a collection of images associated with the two or more sub-regions;
   determining, based at least in part on output from a machine-learned image content analysis model trained to detect one or more of text and logos associated with the brand within each image of the collection of images associated with the two or more sub-regions, a number of detections of a brand within each respective sub-region;
   generating a brand penetration index for each sub-region, wherein the brand penetration index is based on the number of detections of the brand in the respective sub-region; and
   storing the brand penetration index for each sub-region in memory in association with an indicator of the respective sub-region.

* * * * *